United States Patent
Guo et al.

(10) Patent No.: US 12,451,760 B2
(45) Date of Patent: Oct. 21, 2025

(54) INTEGRATED DRIVE GEAR MOTOR ASSEMBLY FOR A VEHICLE

(71) Applicant: DONGFENG DANA AXLE CO., LTD., Hubei (CN)

(72) Inventors: Ning Guo, Xiangyang (CN); Shengli Hu, Xiangyang (CN); Kaishuo Zhang, Xiangyang (CN); Minghan Tang, Xiangyang (CN)

(73) Assignee: DONGFENG DANA AXLE CO., LTD., Hubei (CN)

( * ) Notice: Subject to any disclaimer, the term of this patent is extended or adjusted under 35 U.S.C. 154(b) by 753 days.

(21) Appl. No.: 16/644,483

(22) PCT Filed: Aug. 31, 2018

(86) PCT No.: PCT/CN2018/103427
§ 371 (c)(1),
(2) Date: Mar. 4, 2020

(87) PCT Pub. No.: WO2019/047772
PCT Pub. Date: Mar. 14, 2019

(65) Prior Publication Data
US 2020/0287442 A1  Sep. 10, 2020

(30) Foreign Application Priority Data
Sep. 5, 2017 (CN) ......................... 201721130755.9

(51) Int. Cl.
*H02K 7/116* (2006.01)
*H02K 7/08* (2006.01)

(52) U.S. Cl.
CPC ............. *H02K 7/116* (2013.01); *H02K 7/085* (2013.01)

(58) Field of Classification Search
CPC .......... H02K 7/116; H02K 7/085; H02K 7/00; H02K 7/08; H02K 7/083
(Continued)

(56) References Cited

U.S. PATENT DOCUMENTS

2004/0130224 A1* 7/2004 Mogi ..................... H02K 5/203
310/75 R
2006/0261689 A1* 11/2006 Natsuhara ................ H02K 5/15
310/90

(Continued)

FOREIGN PATENT DOCUMENTS

| CN | 101312315 A | 11/2008 |
| CN | 204304747 U | 4/2015 |

(Continued)

OTHER PUBLICATIONS

ISA State Intellectual Property Office of the People's Republic of China, International Search Report and Written Opinion Issued in Application No. PCT/CN2018/103427, Nov. 26, 2018, WIPO, 7 pages.

*Primary Examiner* — Naishadh N Desai
(74) *Attorney, Agent, or Firm* — McCoy Russell LLP

(57) ABSTRACT

An integrated active gear motor assembly may have a housing with a stator and a rotor located within the housing. The assembly may also have a motor output shaft located within the stator with a gear portion of the motor output shaft extending out of the housing. A drive gear may be connected to the gear portion of the shaft. The drive gear may be integrally formed, unitary and one-piece with the motor output shaft to rotate with the motor output shaft.

12 Claims, 1 Drawing Sheet

(58) Field of Classification Search
USPC .............................................. 310/83, 89, 90
See application file for complete search history.

(56) References Cited

U.S. PATENT DOCUMENTS

| | | | | |
|---|---|---|---|---|
| 2014/0346906 | A1* | 11/2014 | Paulides | ................ H02K 7/116 |
| | | | | 310/59 |
| 2014/0364263 | A1* | 12/2014 | Tokunaga | ............. B60L 3/0061 |
| | | | | 310/90 |
| 2015/0137632 | A1* | 5/2015 | Takahashi | ................ H02K 1/28 |
| | | | | 310/216.106 |
| 2015/0330452 | A1* | 11/2015 | Mongeau | ............. H02K 5/1732 |
| | | | | 310/90 |
| 2016/0099632 | A1* | 4/2016 | Rawlinson | ............. H02K 7/116 |
| | | | | 310/83 |
| 2016/0276905 | A1* | 9/2016 | Lai | ...................... F16H 57/0476 |
| 2018/0278114 | A1* | 9/2018 | Park | ...................... F16H 57/039 |
| 2019/0181724 | A1* | 6/2019 | Nakamatsu | ............... H02K 1/30 |
| 2019/0186622 | A1* | 6/2019 | Ishikawa | ............... F16H 57/021 |
| 2020/0287442 | A1* | 9/2020 | Guo | ........................ H02K 7/08 |

FOREIGN PATENT DOCUMENTS

| | | |
|---|---|---|
| CN | 206313604 U | 7/2017 |
| CN | 207265810 U | 4/2018 |

\* cited by examiner

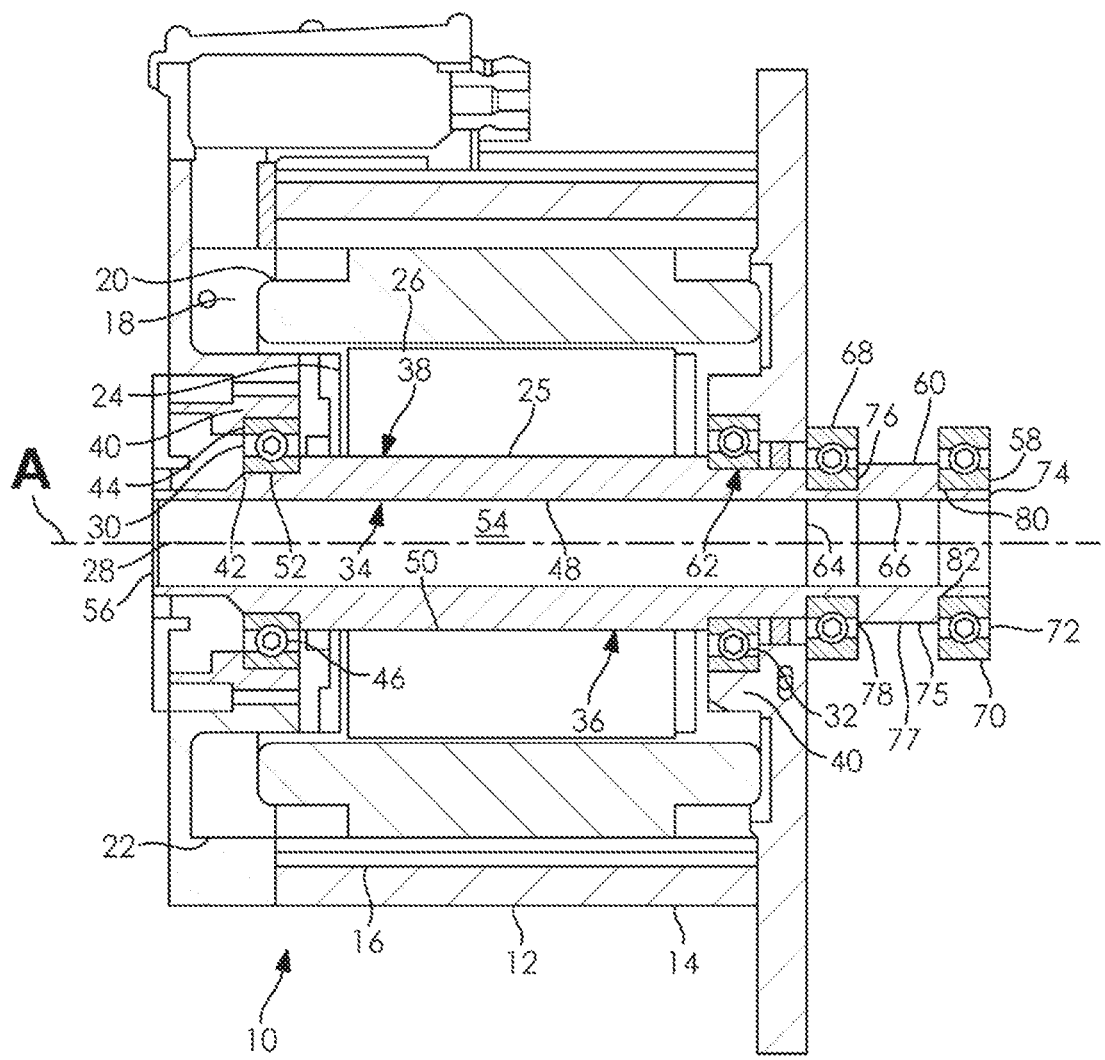

INTEGRATED DRIVE GEAR MOTOR ASSEMBLY FOR A VEHICLE

CROSS-REFERENCE TO RELATED APPLICATIONS

The present application is a U.S. National Phase of International Patent Application Serial No. PCT/CN2018/103427 entitled "AN INTEGRATED DRIVE GEAR MOTOR ASSEMBLY FOR A VEHICLE," filed on Aug. 31, 2018. International Patent Application Serial No. PCT/CN2018/103427 claims priority to Chinese Utility Model application No. 201721130755.9 filed on Sep. 5, 2017. The entire contents of each of the above-referenced applications are hereby incorporated by reference for all purposes.

TECHNICAL FIELD

An integrated drive gear motor assembly for a vehicle, such as for an electric vehicle, is described.

BACKGROUND AND SUMMARY

Motors, such as electric motors, are well-known devices. These motors typically comprise a stator and a rotor connected to shaft. These components typically reside in a housing. The rotor may have conductors that carry currents, which interact with the magnetic field of the stator to generate forces that turn the shaft. It is also known for some rotors to carry permanent magnets and the stator to hold the conductors. Typically, the stator is the stationary part of the motor's electromagnetic circuit and it usually consists of either windings or permanent magnets. Windings are wires that are typically wrapped around a magnetic core so as to form magnetic poles when energized with the circuit.

In most cases, the above-mentioned shaft is provided with a first set of splines. A drive gear may be mounted on the first set of splines with a second set of complementary splines. This spline to spline connection, however, has several disadvantages. The disadvantages include, but are not limited, requiring a large space to accommodate this type of connection. For example, for the connection between splines to be secure, the splines must be of a particular size. The splines thus increase the outer diameter of the shaft on which the drive gear resides. In addition, the internal splines on the drive gear require the drive gear outer diameter to increase. Even one of these increases can cause the motor to not fit in the available space.

As can be appreciated from the discussion above, the large internal and external splines also add weight to the motor. Here again, in environments where weight savings are critical, such unnecessary weight gains are undesirable.

When the spline sets are not adequately formed or mated with one another, the reliability of the prior art connection also becomes a liability of the system. It is also possible that the drive gear does not ride evenly or concentrically with the shaft if the splines, or other features of the shaft or gear, are not properly formed or mated. In machines requiring high precision, or where space is a premium, such an imprecise connection may cause the motor to require frequent maintenance or even fail.

In view of the disadvantages of the connection between the shaft and drive gear of the prior art devices, it would be advantageous to have a shaft and drive gear connection that is highly reliable, highly precise, compact, lightweight, quiet and which operates smoothly, but which also provides sufficient torque capacity. By way of example, such a device is highly desirable in an electric vehicle that uses one or more electric motors.

An integrated active gear motor assembly may have a housing with a stator and a rotor located within the housing. The assembly may also have a motor output shaft located within the stator with a gear portion of the motor output shaft extending out of the housing. A drive gear may be connected to the gear portion of the shaft. The drive gear may be integrally formed, unitary and one-piece with the motor output shaft to rotate with the motor output shaft.

In another aspect, the motor output shaft may be hollow along its entire length.

In another aspect, the inner ball bearing may be located directly adjacent the housing on the motor output shaft and the outer ball bearing may be spaced from the inner ball bearing on the motor output shaft by the drive gear.

In another aspect, the outer ball bearing may be located directly adjacent an end of the shaft.

In another aspect, an outside side of the inner ball bearing may be directly adjacent an inside side of the drive gear and an outside side of the drive gear may be directly adjacent an inside side of the outer ball bearing.

In another aspect, the motor output shaft may be sized to accommodate the maximum torque experienced by the drive gear.

In another aspect, no auxiliary connection structures may be required to connect the motor output shaft to the drive gear.

In another aspect, the gear portion comprises only a fraction of the overall length of the motor output shaft.

In another aspect, there is no gearing located within the housing.

In another aspect, the motor output shaft is only mounted for rotation within the housing.

BRIEF DESCRIPTION OF DRAWINGS

FIG. 1 is a schematic side view cross section of one embodiment of an integrated gear drive motor assembly.

DETAILED DESCRIPTION

It is to be understood that the device described and depicted herein may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Turning now to FIG. 1, one embodiment of an integrated drive gear motor assembly 10 is depicted. The assembly 10 may include a housing 12. The housing 12 may be comprised of several pieces that are secured together, or a single, integrally formed and unitary piece. The housing 12 may have an outer surface 14 and an inner surface 16. The two surfaces 14, 16 may be connected by a constant thickness material or a variable thickness material.

Radially inward from the inner surface 16 at least one stator 18 is provided. The stator 18 may be one piece or comprised of a plurality of pieces that are connected together. The stator 18 may be secured to the housing 12 such that the two do not move with respect to one another.

The stator 18 and housing 12 may be connected by fasteners, couplings, complementary fittings, adhesives, and/or friction fit and the like. The stator 18 is preferably located entirely within the housing 12.

The stator 18 has an inner surface 20 and an outer surface 22. The outer surface 22 is directly adjacent the inner surface 16 of the housing 12. The stator outer surface 22 may in fact be in direct contact with the inner surface 16 of the housing 12. One or more magnets or windings (not shown) may be located in or on the stator 18.

At least partially radially inward from the at least one stator 18, at least one rotor 24 is provided. The rotor 24 may be one piece or comprised of a plurality of pieces that are connected together. The rotor 24 is mounted within the housing 12 so that it can move, such as rotate along an axis A, with respect to the housing 12 and stator 18. The rotor 24 is preferably located entirely within the housing 12.

The rotor 24 has an inner surface 25 and an outer surface 26. The outer surface 26 of the rotor 24 is directly adjacent the inner surface 20 of the stator 18. Preferably, a gap separates the outer surface 26 of the rotor 24 and the inner surface 20 of the stator 18 so that the rotor 24 can rotate with respect to the stator 18.

Radially inward from the inner surface 25 of the rotor 24 is a motor output shaft 28. The rotor 24 may be connected to the motor output shaft 28. The connection may be via fasteners, couplings, complementary fittings, adhesives and/or friction fit or the like. The connection is such that the rotor 24 and the motor output shaft 28 rotate together. The above relationship of the housing 12, the stator 18, the rotor 24 and the shaft 28 all lends itself to the compact nature of the design.

The motor output shaft 28 is partially located within the housing 12 and partially out of the housing 12. The motor output shaft 28 may be mounted for rotation within the housing 12 on one or more bearings. In the depicted embodiment, the motor output shaft 28 is mounted on first and second bearings 30, 32. In that embodiment, the bearings 30, 32 are located within the housing 12 at a first and second end portion 34, 36 of the motor output shaft 28. The first and second end portions 34, 36 are located within the housing 12. The bearings 30, 32 are separated by a central section 38 of the motor output shaft 28. The bearings 30, 32 may be located within the housing 12 such as in housing bearing mounts 40.

Each bearing described herein may include an inner race 42 and outer race 44 and a bearing 46, such as one or more balls, located between the races 42, 44. The inner races 42 may be in direct contact with the motor output shaft 28.

The motor output shaft 28 may have an inner surface 48 and an outer surface 50. The thickness of the motor output shaft 28 may vary between the inner surface 48 and the outer surface 50. For example, the thickness of the motor output shaft 28 may be reduced adjacent the first and second bearings 30, 32. For example, the thickness of the motor output shaft 28 may be reduced radially inward of the first and second bearings 30, 32 to accommodate the bearings 30, 32, such as in bearing seats 52 formed in the motor output shaft 28. Along the center section 38, however, the motor output shaft 28 may have a relatively constant thickness.

The motor output shaft 28 may define a hollow cavity 54 from a first end 56 to a second end 58. The hollow cavity may be continuous and uninterrupted. The cavity 54 may be defined by the inner surface 48, which has a substantially constant diameter. The hollow cavity 54 lends itself to the lightweight nature of the assembly 10.

Preferably, the thickness of the motor output shaft 28 is sized to accommodate the maximum torque experienced by a drive gear 60 (discussed below). The thickness depicted in the FIGURE is simply for illustrative purposes: the thickness can increase or decrease as needed to accommodate more or less torque, respectively.

In one embodiment, an axial outboard portion 62 of the motor output shaft 28 that is axially outboard of the first bearing 30 may further reduce in thickness. As shown in FIG. 1, the axial outboard portion 62 may taper, or step down, in thickness from the first bearing 30 outward.

The motor output shaft 28 extends axially outward from the housing 12 through an opening 64 in the housing 12 adjacent the second bearing 32. The portion of the motor output shaft 28 extending outside of the housing 12 may be designated the gear portion 66 via these bearings 68, 70.

The gear portion 66 may be supported for rotation on a third and fourth bearing 68, 70. The gear portion 66 may be located within another structure which is not shown in FIG. 1 in which the gear portion 66 requires rotational support.

The gear portion 66 may comprise a fraction of the overall length of the motor output shaft 28. By way of one example, the gear portion 66 may be such as ¼ to ⅙ of the overall length of the motor output shaft 28.

The third bearing 68 may be located directly axially adjacent the housing 12. In one embodiment, there is no gap between the third bearing 68 and the housing 12, thus the third bearing 68 and housing 12 are in direct contact with one another. In another embodiment, there may be a gap between the third bearing 68 and the housing 12.

The fourth bearing 70 may be located adjacent the second end 58 of the motor output shaft 28. In the depicted embodiment, an outer surface 72 of the fourth bearing 70 is located axially aligned with an end surface 74 of the motor output shaft 28.

The gear portion 66 may have a reduced thickness at the third and fourth bearings 68, 70, similar to the reduced thickness of the motor output shaft 28 and the first and second bearings 30, 32. Alternatively, the thickness of the gear portion 66 may remain constant with the center shaft section 38.

The drive gear 60 is located on the gear portion 66. Preferably, the drive gear 60 is integrally formed, unitary and one-piece with the gear portion 66 of the motor output shaft 28 so that the two rotate together at all times. More particularly, there are no auxiliary connection structures required to connect the drive gear 60 to the gear portion 66.

The drive gear 60 may be comprised of a plurality of circumferentially extending teeth 75 on an outer surface 77 of the drive gear 60. The teeth 77 are designed to be engaged with, such as in mesh with, complementary teeth on another gear (not shown) or shaft (not shown) to provide rotational drive thereto.

Forming the drive gear 60 with the gear portion 66 results in a compact package where the drive gear 60 and gear portion 66 are securely and precisely attached to one another. The direct connection ensures that the drive gear 60 and gear portion 66 provide a fixed, concentric connection between the two. The compact nature of the connection also reduces the linear velocity of the drive gear 60, which desirably reduces noise.

It is also preferred that the drive gear 60 be located between the third and fourth bearings 68, 70. More particularly, an inner surface 76 of the drive gear 60 may be located in direct axial contact with an outer surface 78 of the third bearing 68 and an outer surface 80 of the drive gear 60 may be located in direct axial contact with an inner surface 82 of the fourth bearing 70. It is also permissible for gaps to be located between the bearings 68, 70 and the drive gear 60.

The motor output shaft 28 is only mounted for rotation within the housing 12. The motor output shaft 28 is not adapted for axial, or other, movement within the housing 12.

Preferably, there is no gearing or related structures within the housing 12. The housing 12 contains the above-mentioned structures in a relatively self-contained and self-sufficient structure. This lends itself to the compact nature of the assembly 10. Of course, electrical power and/or controls may be added to the housing 12, or connected to the stator 18/rotor 24.

The above-described integrated drive gear motor assembly 10 is a smoothly operating, compact, lightweight design that provides a precise but robust driveshaft and gear connection. In accordance with the provisions of the patent statutes, the present device has been described in what is considered to represent its preferred embodiments. However, it should be noted that the device can be practiced otherwise than as specifically illustrated and described without departing from its spirit or scope.

What is claimed is:

1. An integrated drive gear motor assembly for an electric vehicle, the integrated drive gear motor assembly comprising:
    an electric vehicle motor housing with a stator and a rotor located within the housing;
    an electric vehicle motor output shaft with the rotor attached thereto and rotatably mounted within the housing via a pair of ball bearings with the rotor and a portion of the motor output shaft between each one of the pair of bearings so as to rotate the rotor within the stator and within the housing, with a gear portion of the motor output shaft extending out of the stator and the housing, wherein the motor output shaft is hollow along its entire axial length and is formed as a one-piece hollow tube;
    an electric vehicle drive gear formed in the gear portion of the motor output shaft; and
    an inner ball bearing and an outer ball bearing positioned outside of the housing and attached to the motor output shaft with the gear portion positioned between the inner ball bearing and the outer ball bearing,
    wherein the drive gear is connected to the motor output shaft without splines or auxiliary connection structures such that the drive gear is integrally formed, unitary and one-piece with the motor output shaft and thereby rotates with the motor output shaft, and
    wherein, so as to minimize an axial length of the integrated drive gear motor assembly, the housing and the inner ball bearing are directly axially adjacent to one another, the inner ball bearing and the drive gear are directly axially adjacent to one another, and the outer ball bearing and the drive gear are directly axially adjacent to one another.

2. The assembly of claim 1, wherein the motor output shaft comprises a hollow cavity extending along its entire length, with the hollow cavity having a substantially constant diameter throughout.

3. The assembly of claim 1, wherein the inner ball bearing comprises an inner race and an outer race, and is located directly adjacent the housing on the motor output shaft, and the outer ball bearing comprises an inner race and an outer race, and is spaced axially apart from the inner ball bearing on the motor output shaft by an axial width of the drive gear.

4. The assembly of claim 1, wherein the outer ball bearing is located directly adjacent an end surface of the motor output shaft.

5. The assembly of claim 1, wherein the outside surface of the inner ball bearing is directly adjacent to and in direct axial contact with the inner surface of the drive gear, and the outer surface of the drive gear is directly adjacent to and in direct axial contact with the inner surface of the outer ball bearing.

6. The assembly of claim 1, wherein motor output shaft is sized to accommodate a maximum torque experienced by the drive gear.

7. The assembly of claim 1, wherein no auxiliary connection structures are required to connect the motor output shaft to the drive gear.

8. The assembly of claim 1, wherein the gear portion comprises only a fraction of the overall length of the motor output shaft.

9. The assembly of claim 1, wherein there is no gearing located within the housing.

10. The assembly of claim 1, wherein the motor output shaft is only mounted for rotation within the housing and for no axial or other non-rotative motion.

11. The assembly of claim 1, wherein the gear portion comprises one quarter (¼) to one sixth (⅙) of the overall length of the motor output shaft.

12. The assembly of claim 1, wherein the inner ball bearing comprises an inner race and an outer race, the outer ball bearing comprises an inner race and an outer race, the outer race of the inner ball bearing is in direct contact with the housing, and the inner races of the inner and outer ball bearings are each in direct contact with the motor output shaft.

* * * * *